(12) United States Patent
Ieluzzi et al.

(10) Patent No.: US 12,370,986 B2
(45) Date of Patent: Jul. 29, 2025

(54) VEHICLE BRAKING SYSTEM

(71) Applicant: C.R.F. Società Consortile per Azioni, Orbassano (IT)

(72) Inventors: Michele Ieluzzi, Orbassano (IT); Paolo Graziano, Orbassano (IT); Renato Badino, Turin (IT); Luigi Petruccelli, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 225 days.

(21) Appl. No.: 17/664,716

(22) Filed: May 24, 2022

(65) Prior Publication Data

US 2022/0379859 A1     Dec. 1, 2022

(30) Foreign Application Priority Data

May 25, 2021 (EP) .................................. 21175737

(51) Int. Cl.
  *B60T 8/44* (2006.01)
  *B60T 8/40* (2006.01)
  (Continued)

(52) U.S. Cl.
  CPC ............... *B60T 8/445* (2013.01); *B60T 8/40* (2013.01); *B60T 8/4845* (2013.01); *B60T 13/686* (2013.01)

(58) Field of Classification Search
  CPC ......... B60T 8/445; B60T 8/40; B60T 8/4845; B60T 13/686; B60T 7/042; B60T 8/326;
  (Continued)

(56) References Cited

U.S. PATENT DOCUMENTS 4,362,339 A * 12/1982 Belart ..................... B60T 8/445
                                                      303/117.1
4,755,008 A    7/1988 Imoto et al.
(Continued)

FOREIGN PATENT DOCUMENTS

JP    2000177562 A     6/2000
WO       9737878 A1   10/1997
WO    2019195542 A1   10/2019

OTHER PUBLICATIONS

European Search Report, 3 pp., dated Oct. 25, 2021.

*Primary Examiner* — Robert A. Siconolfi
*Assistant Examiner* — James K Hsiao
(74) *Attorney, Agent, or Firm* — Heslin Rothenberg Farley and Mesiti, PC; Victor A. Cardona Esq.

(57) ABSTRACT

A vehicle braking system includes a master cylinder. In a delivery line of the master cylinder there is a pressure transfer device, which generates a pressure in a hydraulic actuating line of a respective brake device following a fluid pressure communicated to a first inlet of the pressure transfer device from the delivery line and/or following a fluid pressure supplied to a second inlet of the pressure transfer device from an electrically-operated fluid pressure source. An electronic controller controls an enabling/disabling solenoid valve, and the electrically-operated fluid pressure source to create different operating modes of the system. The system does not include any vacuum-operated servo-assisting devices. The master cylinder is associated with a hydraulic device for adjusting the feeling on the brake pedal, in which a fluid pressure is generated that opposes the brake pedal actuation. The electronic controller controls the pressure in the device for adjustment of the feeling on the pedal.

17 Claims, 5 Drawing Sheets

(51) Int. Cl.
*B60T 8/48* (2006.01)
*B60T 13/68* (2006.01)

(58) Field of Classification Search
CPC ...... B60T 8/368; B60T 8/4072; B60T 8/4081; B60T 13/145; B60T 13/745; B60T 2270/82
See application file for complete search history.

(56) References Cited

U.S. PATENT DOCUMENTS

| | | | | |
|---|---|---|---|---|
| 5,383,718 | A * | 1/1995 | Burgdorf | B60T 8/4872 |
| | | | | 303/116.1 |
| 8,651,587 | B2 * | 2/2014 | Baechle | B60T 7/042 |
| | | | | 303/119.2 |
| 2007/0278855 | A1 | 12/2007 | Hatano | |
| 2010/0084914 | A1 * | 4/2010 | Hatano | B60T 8/4872 |
| | | | | 303/113.5 |
| 2014/0131154 | A1 * | 5/2014 | Ganzel | B60T 13/588 |
| | | | | 303/14 |
| 2015/0021981 | A1 * | 1/2015 | Shimada | B60T 8/176 |
| | | | | 303/121 |
| 2017/0129469 | A1 * | 5/2017 | Besier | B60T 13/142 |
| 2017/0274884 | A1 * | 9/2017 | Besier | B60T 13/686 |
| 2017/0361825 | A1 * | 12/2017 | Drumm | B60T 8/4081 |
| 2019/0366997 | A1 * | 12/2019 | Jeong | B60T 13/167 |

* cited by examiner

VEHICLE BRAKING SYSTEM

CROSS REFERENCE TO RELATED APPLICATIONS

This application claims priority from European Patent Application No. 21175737.2 filed on May 25, 2021, the entire disclosure of which is incorporated herein by reference.

FIELD OF THE INVENTION

The present invention relates to braking systems for vehicles, of the type comprising a master cylinder including at least one pumping piston operatively connected to a brake pedal, and configured to supply pressurized fluid to a delivery line of the master cylinder, following an actuation of the brake pedal, so as to cause the activation of a hydraulically-operated brake device associated with a respective wheel of the vehicle.

PRIOR ART AND OBJECT OF THE INVENTION

According to one of the conventional techniques in the field of servo-assisted braking systems, a vacuum-operated assisting device is associated with the master cylinder, the assisting device being connected to a vacuum source, for example the intake manifold of the internal combustion engine of the motor-vehicle.

A first object of the present invention is to provide a braking system that does not require a vacuum-operated assisting device and that is therefore suitable for installation on electrically-powered or hybrid vehicles, as well as on conventional vehicles with internal combustion engines.

An additional object of the invention is to control the "feeling" on the brake pedal, i.e., the force that opposes the actuation of the brake pedal, in a manner completely independent from the pressure in the hydraulic line for actuating the brake device.

An additional object of the invention is to provide a braking system that is capable of operating either in a basic operating mode in which the brake device is operated only by the fluid pressure generated by the master cylinder, or in an assisted-braking operating manner, in which the brake device is actuated not only by the fluid pressure generated by the master cylinder, but also by fluid pressure generated by an electrically-operated pressure source, or in an operating mode in which the brake device is operated only by the fluid pressure generated by said electrically-operated pressure source, according to a Brake-by-Wire (BBW) mode.

An additional object of the invention is to provide a braking system of the type indicated above in which, if necessary, the system is also capable of implementing an ABS operating mode.

Yet another object of the invention is to achieve all the aforesaid objects with a relatively simple and inexpensive system, which can be used with any type of brake devices, for example disc brakes or drum brakes, and which is applicable to any type of vehicles.

SUMMARY OF THE INVENTION

In order to achieve one or more of the aforesaid objects, the invention is directed to a vehicle braking system having the characteristics indicated at the beginning of the present description, and further characterized in that said system does not include any vacuum-operated assisting device, and in that a hydraulic device for adjustment of the pedal feeling is operatively associated with the brake pedal and is configured to generate and modulate a force that opposes the actuation of the brake pedal, said device for adjustment of the pedal feeling comprising:

a hydraulic cylinder, with a pressure chamber having an inlet communicating with a discharge reservoir and an outlet communicating with the discharge reservoir through a pressure-limiting proportional solenoid valve, and a pumping member movable in the hydraulic cylinder and operatively connected to the brake pedal, in such a way as to pressurize the fluid in the pressure chamber following an actuation of the brake pedal, so as to generate said force that opposes the actuation of the brake pedal, said system also comprising an electronic controller configured and programmed to control said pressure-limiting proportional solenoid valve, which causes the outlet from the pressure chamber to communicate with the discharge reservoir, in such a way as to vary the pressure in said pressure chamber and, therefore, the feeling on the brake pedal, based on signals received from said electronic controller, and indicative of one or more parameters, selected among position of the brake pedal, speed of the brake pedal and acceleration of the brake pedal.

In a first solution, the aforesaid hydraulic device for adjustment of the pedal feeling is integrated into the master cylinder and has a casing rigidly connected to the master cylinder casing, with the aforesaid movable member of the device for adjustment of the pedal feeling being rigidly connected to said at least one pumping piston of the master cylinder.

In a variant, the hydraulic device for adjustment of the pedal feeling is a unit separate from said master cylinder and has its movable member that is operatively connected—by means of a transmission—to said at least one pumping piston of the master cylinder.

Thanks to the aforesaid characteristics, the feeling on the brake pedal can be modified in real time by simply configuring the software parameters, completely independently of the operating status of the braking system.

According to another characteristic, the hydraulic device for adjustment of the pedal feeling has its outlet connected to the discharge reservoir also by means of a one-way valve, arranged in parallel to the aforesaid proportional solenoid valve, to enable a flow from the reservoir towards the pressure chamber of the device, in such a way as to facilitate the filling of the pressure chamber of the device in the return phase of the movable member and of the brake pedal towards their rest positions.

Thanks to the provision of this non-return valve, a regular return movement of the brake pedal towards its rest position after braking is possible, allowing the return of fluid into the pressure chamber of the hydraulic cylinder through this valve even before this pressure chamber returns to communicate directly with the reservoir through the inlet opening of the hydraulic cylinder, following the return movement of the movable member within the cylinder. In this way, cavitation phenomena are also avoided inside the device for adjustment of the pedal feeling, which—in the face of repeated operations—could damage this device.

Another relevant characteristic of the braking system according to the invention lies in that the brake device can be operated both by the fluid pressure generated by the master cylinder and, in addition or alternatively thereto, by a fluid pressure generated from an electrically-operated fluid pressure source, in a Brake-by-Wire (BBW) mode.

To obtain this result, according to another characteristic of the braking system of the invention, the system also comprises a mechanical pressure transfer device, for transferring hydraulic pressure from the delivery line of the master cylinder to a hydraulic line for actuating the brake device. The pressure transfer device comprises a cylinder with a piston member, which is movable within the cylinder between a first upstream chamber, communicating with the delivery line of the master cylinder and a downstream chamber, communicating with the hydraulic actuating line of the brake device. In this way, the pressure generated by the master cylinder in said delivery line, following an intervention on the brake pedal, causes a movement of the piston member of the pressure transfer device, which—in turn—generates a pressure in the hydraulic actuating line of the brake device. Furthermore, the pressure transfer device comprises a second upstream chamber, operatively arranged in parallel with said first upstream chamber and connected to an electrically-operated fluid pressure source.

In this way, the movement of the piston member of the pressure transfer device, which generates the pressure in the hydraulic actuating line of the brake device, can be caused not only by the pressure in the delivery line of the master cylinder, but also, in addition or alternatively thereto, by the pressure generated by said electrically-operated fluid pressure source.

According to another characteristic, in the delivery line of the master cylinder, between the outlet of the master cylinder and said upstream first chamber of the pressure transfer device, a solenoid valve for enabling/disabling the master cylinder is interposed, having a first operating condition, in which it causes the outlet of the master cylinder to communicate with said first upstream chamber of the pressure transfer device, and a second operating condition, in which the first upstream chamber of the pressure transfer device is placed in communication with the discharge reservoir, and in which the outlet of the master cylinder is placed in communication with the discharge reservoir through a restricted passage.

In the preferred embodiment, said solenoid valve for enabling/disabling the master cylinder is in said first enabling operating condition of the master cylinder when it is de-energized, and is in said second disabling operating condition of the master cylinder when it is energized.

In a variant, the solenoid valve for enabling/disabling the master cylinder has a third operating condition, intermediate between its first operating condition and its second operating condition, in which the solenoid valve is temporarily left open when a passage is commanded from the first operating position to the second operating position or vice versa, in such a way as to avoid a return pressure stroke on the brake pedal.

Thanks to the aforesaid characteristics, the electronic controller can be configured and programmed to control the solenoid valve for enabling/disabling the master cylinder, and the aforesaid electrically-operated fluid pressure source, so as to be able to selectively activate one or more of the following operating modes:

a basic braking operating mode, in which said solenoid valve for enabling/disabling the master cylinder is in its first enabling operating condition of the master cylinder, and the electrically-operated fluid pressure source is inactive, so that the brake device is operated by the brake pedal by means of the master cylinder, an assisted-braking operating mode, in which said solenoid valve for enabling/disabling the master cylinder is in its first enabling operating condition of the master cylinder, and the electrically-operated fluid pressure source is active, so that the brake device is operated by the brake pedal by means of the master cylinder, but the fluid pressure supplied to the brake device is the result of both the pressure generated by the master cylinder and the pressure generated by the electrically-operated fluid pressure source, an electric-only braking operating mode, in which said solenoid valve for enabling/disabling the master cylinder is in its second operating condition disabling the master cylinder, and the electrically-operated fluid pressure source is active, so that the brake device is only operated by the pressure generated by said electrically-operated fluid pressure source, and an operating mode for activating an ABS effect, in which, following detection by the electronic controller of a condition of incipient locking of a vehicle wheel during braking (controlled by the brake pedal through the master cylinder) said solenoid valve for enabling/disabling the master cylinder is switched from its first enabling operating condition to its second disabling operating condition of the master cylinder, and said electrically-operated fluid pressure source is activated to generate a reduced pressure in the supply line of the brake device, in order to avoid locking of the wheel during braking.

In this last condition described above, in which the solenoid valve for enabling/disabling the master cylinder is switched to the disabling condition, the outlet opening of the master cylinder is indirectly connected to the discharge, through the aforesaid restricted passage, so that rapid emptying of the master cylinder chamber is prevented, so as to prevent the brake pedal from moving suddenly to its fully lowered position due to instantaneous cancellation of the pressure in the master cylinder.

The aforesaid restricted passage may be integrated into the solenoid valve for enabling/disabling the master cylinder, or it can be arranged in the communication line between this solenoid valve and the discharge reservoir.

When the electrically-operated fluid pressure source is activated, it is controlled by the electronic controller based on signals received from the electronic controller and indicative of one or more pedal operating parameters (such as position, speed and acceleration of the pedal) and/or of one or more operating parameters of the vehicle (such as the angular speed of rotation of the respective vehicle wheel).

In an actual embodiment, the master cylinder is of the tandem type, comprising at least two pumping pistons operatively arranged in series with each other and configured to supply pressurized fluid to at least two delivery lines of the master cylinder, following actuation of the brake pedal. In each of said at least two delivery lines of the master cylinder a respective solenoid valve is interposed for enabling/disabling the master cylinder, which controls the connection between a respective outlet of the master cylinder and one or more mechanical pressure transfer devices. Each of said mechanical pressure transfer devices is connected to a respective electrically-operated fluid pressure source and is arranged to generate fluid pressure in the hydraulic actuating line of a respective brake device.

In a first solution, which refers to a motor-vehicle with front wheels and rear wheels all equipped with hydraulically-operated brake devices (for example, disc brakes or drum brakes), each of the two aforesaid delivery lines of the master cylinder controls two brake devices associated with two wheels of the vehicle, by means of a respective enabling/disabling solenoid valve, connected to two mechanical pressure transfer devices that control the fluid pressure in the actuating lines of the two brake devices, and that are also each connected to a respective electrically-operated fluid pressure source.

In a second solution, which refers to a motor-vehicle having two wheels equipped with hydraulically-operated brake devices and two wheels equipped with electrically-operated brake devices, each of the two delivery lines of the master cylinder controls only one respective brake device associated with a vehicle wheel, by means of an enabling/disabling solenoid valve connected to a pressure transfer device, which controls the fluid pressure in the actuating line of said respective brake device, and which is also connected to a respective electrically-operated fluid pressure source, the aforesaid system also includes two electrically-operated brake devices associated with two additional wheels of the vehicle, which are directly controlled by said electronic controller.

The invention also relates to a method for controlling a braking system of a vehicle, according to what is indicated in the attached claim 15.

Thanks to all the characteristics indicated above, the braking system according to the invention provides a number of relevant advantages.

Firstly, the system does not require vacuum-operated servo-assistance, so that it is applicable on electrically-powered vehicles and hybrid vehicles, as well as on vehicles with conventional internal combustion engines.

Furthermore, in the system according to the invention, the feeling on the brake pedal can be controlled in any predetermined way, regardless of the actuating pressure of the brake devices.

As indicated above, the braking system according to the invention is capable of operating both as a conventional system, in which the supply pressure of the brake device is generated by the master cylinder following intervention on the brake pedal, and as an assisted-braking system, in which the actuating pressure of the brake device is generated by the joint contribution of the master cylinder and the electrically-operated pressure source. Finally, the braking system according to the invention may operate by exploiting only the pressure generated by the electrically-operated pressure source, according to a Brake-by-Wire mode that can be activated and controlled by the aforesaid electronic controller according to any predetermined logic, therefore even in self-driving vehicles.

Switching between the different operating modes is achieved simply by controlling the solenoid valve for enabling/disabling the master cylinder that is associated with each delivery line of the master cylinder, and by controlling the electrically-operated pressure source that is associated with each hydraulically-operated brake device. The pressure transfer device, which is also associated with each hydraulically-operated brake device, has two inlets connected, respectively, to the delivery line of the master cylinder and to the electrically-actuated pressure source, and an outlet connected to the actuating line of the brake device and is thus capable of generating an actuating pressure of the brake device, which is the result of the pressure generated by the master cylinder and/or of the pressure generated by the electrically-operated pressure source.

As shown above, the system according to the invention is also able to obtain an ABS effect if tendency is detected of a vehicle wheel to lock during a braking controlled by the brake pedal. In this case, the electronic controller, which detects the need for ABS intervention following the signals received from one or more sensors (for example, from a sensor that detects a decrease in the angular speed of the wheel below a predetermined threshold), causes the disabling of the master cylinder and the continuation of braking by means of the intervention of the electrically-operated pressure source only, which is adjusted to achieve a reduced braking pressure, such as to avoid locking of the wheel.

As already indicated, in all the operating modes described above, the force that opposes the actuation of the brake pedal, i.e. the feeling on the brake pedal, is regulated in any predetermined way by means of the aforesaid device for adjustment of the feeling on the brake pedal, regardless of the operating pressure of the brake device.

The braking pressure supplied to the brake devices associated with the different wheels of the vehicle can also be controlled in different ways by the electronic controller, for the need to provide an ABS effect only on the wheels that tend to lock, and for obtaining a stabilizing effect if an electronic vehicle stability control system detects the need for a correction control. The electronic controller is also able to manage the blending between the different braking modes, ensuring both braking performance and comfort for the vehicle occupants at the same time.

DETAILED DESCRIPTION OF PREFERRED EMBODIMENTS

Further characteristics and advantages of the invention will become apparent from the description that follows with reference to the attached drawings, provided purely by way of non-limiting example, in which.

GENERAL CONFIGURATION OF THE SYSTEM

Figure 1:
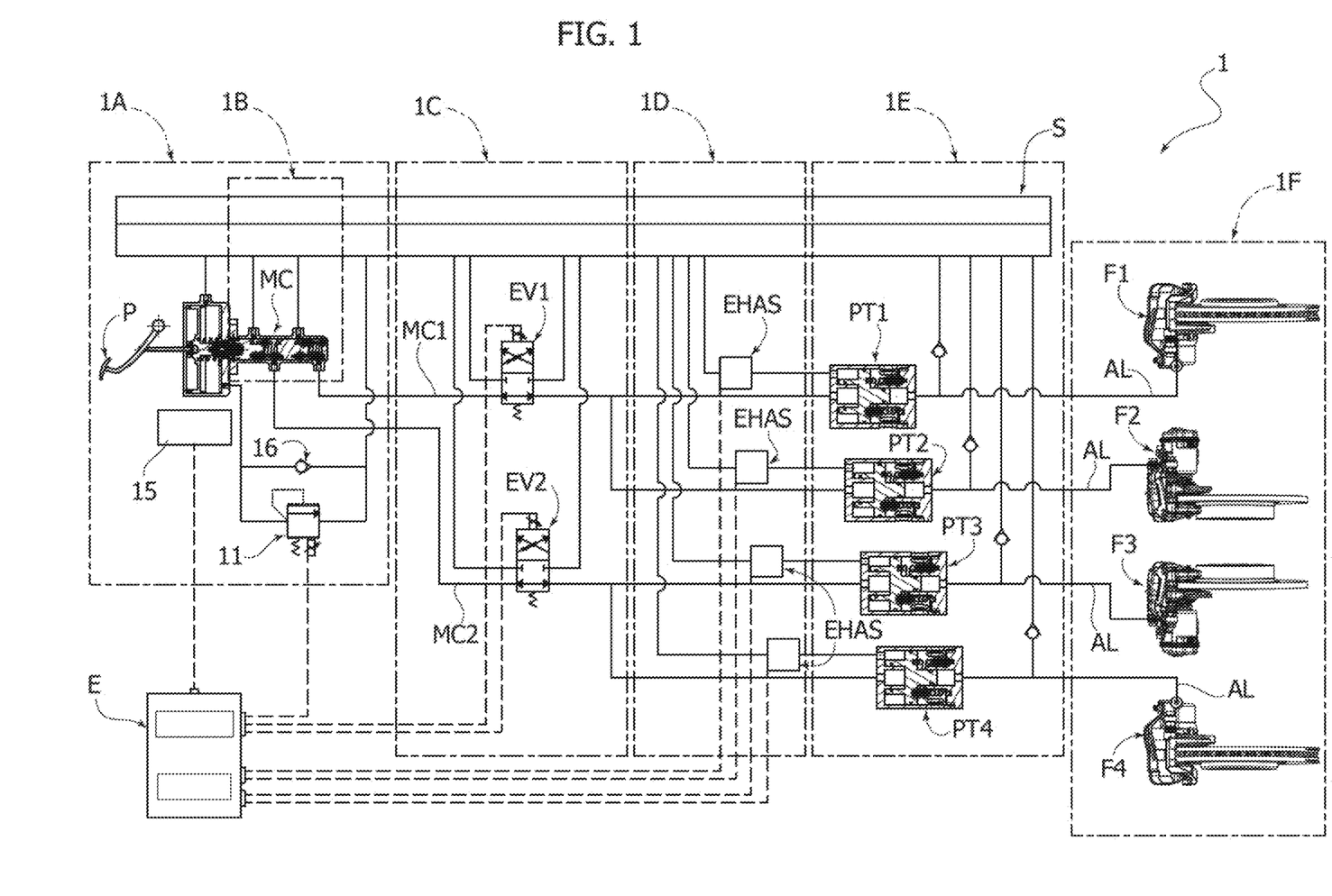
FIG. 1 is a diagram of a first embodiment of the braking system according to the invention.

In FIG. 1, reference 1 indicates—in its entirety—a braking system for a motor-vehicle, including four hydraulically-operated brake devices F1, F2, F3, F4, associated, respectively, with the four wheels of the vehicle. In the example, the brake devices F1 and F4 are associated with the two front wheels of the motor-vehicle, while the brake devices F2, F3 are associated with the two rear wheels of the motor-vehicle. Of course, the configuration of FIG. 1 is completely independent of the type of hydraulic brake device associated with each wheel of the vehicle. The invention is—in fact—applicable using hydraulically-operated brake devices of any known type (for example, disc brakes or drum brakes).

Referring again to FIG. 1, the braking system 1 comprises sub-groups 1A, 1B, 1C, 1D, 1E, 1F and an electronic controller E.

The sub-group 1A is configured to allow a control of the contrasting force of the brake pedal actuation (feedback in force), which causes the feeling on the brake pedal, i.e., the reaction that the driver feels when he actuates the brake pedal.

The sub-group 1B mainly comprises a master cylinder MC of any known type, intended to generate a fluid pressure following an intervention on the brake pedal.

The sub-group 1C comprises one or more solenoid valves (in the illustrated example two solenoid valves EV1, EV2) configured to enable or disable the influence of the cylinder MC on one or more brake devices.

The sub-group 1D comprises one or more electrically-operated fluid pressure sources EHAS ("Electro-Hydraulic Actuation System") designed to create fluid pressure, which adds or replaces the fluid pressure generated by the master cylinder MC to give rise to a hydraulic pressure to actuate the respective brake devices.

The sub-group 1E comprises a plurality of mechanical pressure transfer devices, each of which has two inlets connected, respectively, to a delivery line of the master cylinder MC and to a respective electrically-operated pressure source EHAS, to supply, accordingly, at its outlet—an actuating pressure of the respective brake device.

The sub-group 1F consists of the group of brake devices associated with the wheels of the vehicle, which transform the hydraulic pressure supplied thereto into braking torques on the respective wheels.

The pressure transfer devices are indicated, respectively, with PT1, PT2, PT3, PT4 in the example illustrated in FIG. 1.

Again, with reference to FIG. 1, the reference S indicates a discharge and supply reservoir for the hydraulic system.

The configuration and operation of the different sub-groups 1A, 1B, 1C, 1D, 1E, 1F and the functions of the electronic controller E are described below.

The Master Cylinder

Figure 3:
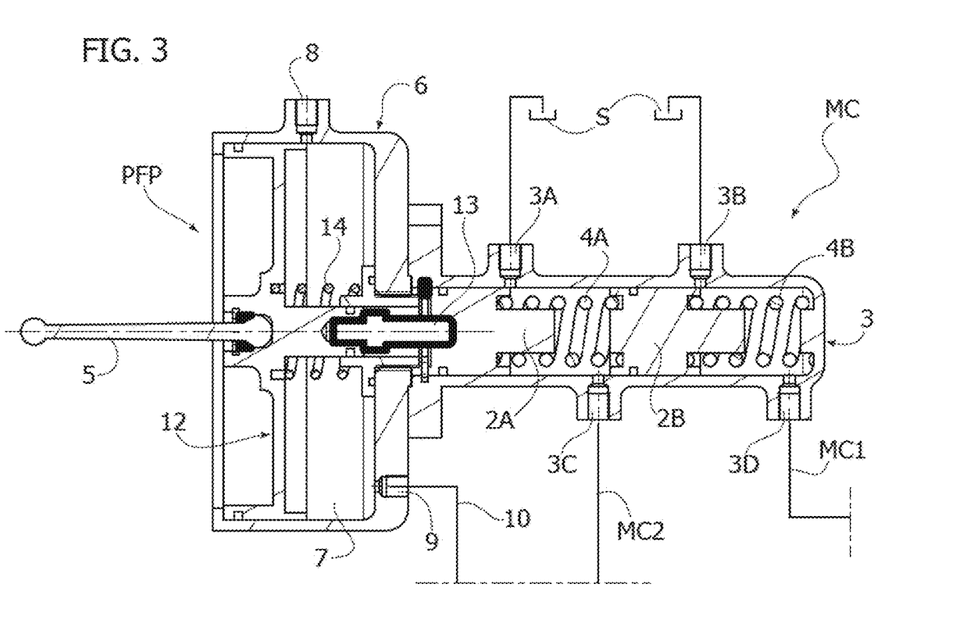
FIG. 3 illustrates an additional detail of FIG. 2 on an enlarged scale.

In the example of FIGS. 1 and 3, the master cylinder MC is of the known type with two pumping pistons arranged operatively in series with each other within a casing 3 and displaceable against the action of springs 4A, 4B due to an intervention on the brake pedal P (FIG. 1). The brake pedal P is operatively connected to a rod 5, which is—in turn—operatively connected to the piston 2A. The inner cavity of the casing 3 communicates with the reservoir S through two inlets 3A, 3B, and also communicates with two delivery lines MC1, MC2 of the master cylinder MC through two outlets 3C, 3D.

An intervention on the brake pedal P (FIG. 1) causes a movement of the rod 5 and, consequently, of the first piston 2A of the master cylinder MC, which is operationally connected (in the way that will be described below) to the rod 5. The movement of the piston 2A closes the opening 3A and pressurizes the fluid in the chamber of the master cylinder MC communicating with the delivery line MC2. At the same time, the pressure in the chamber comprised between the two pistons 2A, 2B also determines a movement of the second piston 2B, which pressurizes the fluid in the chamber communicating with the delivery line MC1, once the piston 2B has closed the second inlet 3B.

The predisposition of the inlet openings 3A, 3B allows the possibility of bleeding the air from the braking system, replenishing the volume of air-oil emulsion eliminated during the purging step of the hydraulic circuit with oil from the reservoir S. Furthermore, the inlet openings 3A, 3B communicating with the discharge reservoir S allow recovering the unwanted clearances that are created with the aging of the system, due to the progressive wear of the friction elements used in the brake devices (whether they are disc brakes or drum brakes).

The Device for Adjusting the Feeling on the Brake Pedal

With reference again to FIGS. 2, 3, the sub-group 1A of the system according to the invention comprises a hydraulic adjustment device of the feeling on the brake pedal, indicated with the reference PFP ("Pedal Feeling Pump"). The PFP adjustment device comprises a hydraulic cylinder 6, with a pressure chamber 7 having an inlet 8 communicating with a discharge reservoir S, and an outlet 9 communicating with the discharge reservoir S through a line 10 in which a pressure-limiting proportional solenoid valve 11 is interposed, whose solenoid 11A is controlled by the electronic controller E, so as to regulate the passage section through the valve 11 in proportion to the electrical command sent thereto by the electronic controller E. A pumping member 12 is slidably mounted inside the hydraulic cylinder 6, having a central body connected on one side, by means of the rod 5, to the brake pedal, and on the other side, by means of a connecting member 13, to the first piston 2A of the master cylinder MC.

Figure 2:
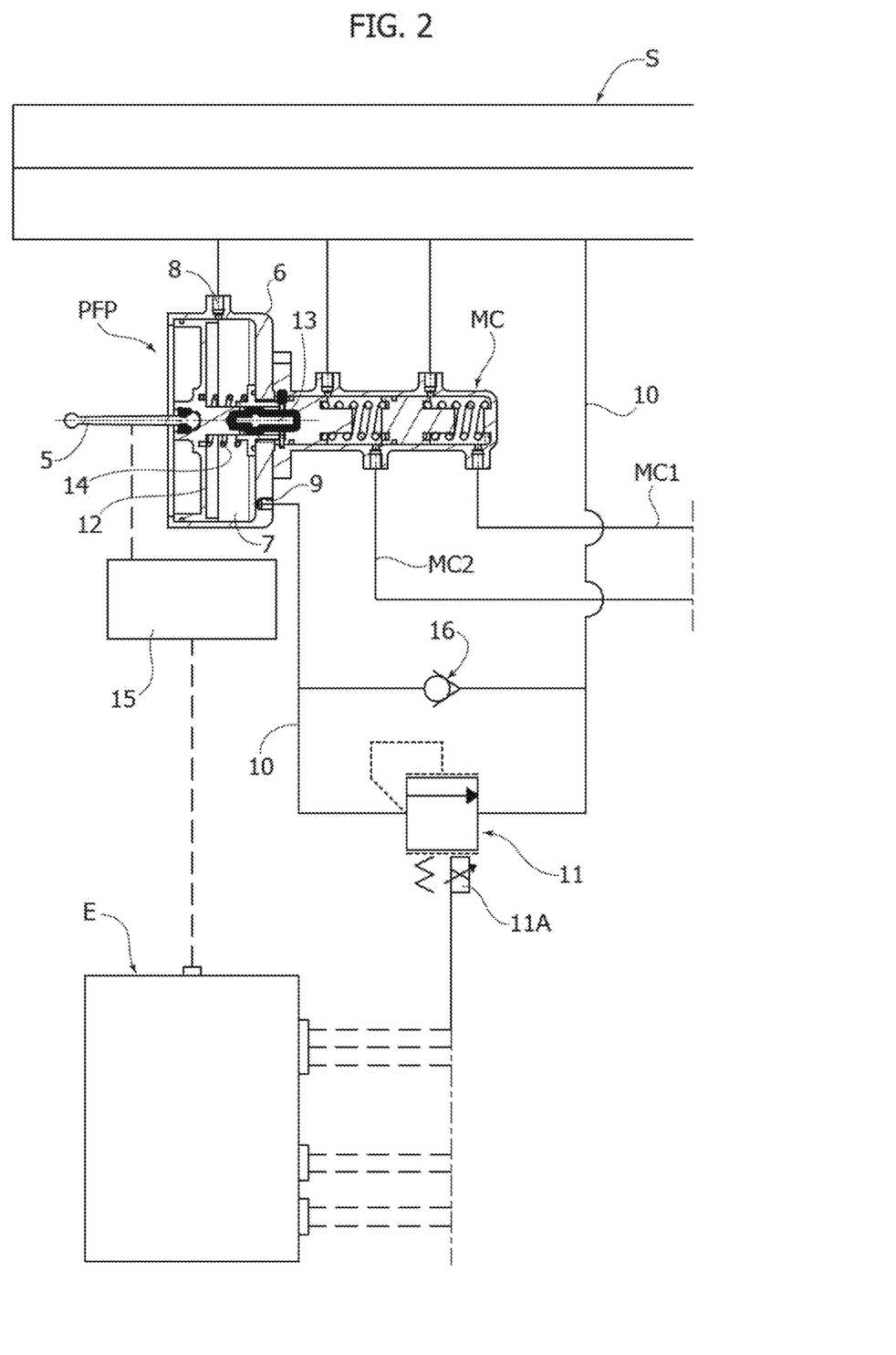
FIG. 2 illustrates a detail of FIG. 1 on an enlarged scale.

The pumping member 12 may be pushed by the brake pedal, against the action of a spring 14, so as to pressurize the fluid in the chamber 7, since said chamber cannot freely discharge into the discharge reservoir S through the line 10, due to the resistance opposed by the passage through the proportional solenoid valve 11. Therefore, when the brake pedal is operated, it encounters a force opposing its movement, which is, for its predominant part, a function of the pressure existing in the chamber 7.

It may be observed that the configuration of the PFP device is substantially similar to that adopted for the vacuum-assisted devices used in traditional braking devices. In these conventional devices, the chamber 7 is placed in communication with a vacuum source (for example, the intake manifold of the internal combustion engine of the vehicle) so as to generate an assistance action that helps the movement of the brake pedal. Conversely, in the braking system according to the invention there is no vacuum servo-assistance device and the chamber 7 is a chamber, which is placed at a controlled pressure, to instead generate a contrast force when the brake pedal is operated. This contrast force causes the feeling that the driver feels when operating the brake pedal.

The electronic controller E may control the proportional solenoid valve 11, according to any predetermined program, to achieve a required load feedback on the brake pedal, regardless of the operating state of the braking system and regardless of the actuating pressure of the brake devices associated with the vehicle wheels.

To this end, the system according to the invention comprises one or more sensors 15 (schematically illustrated in FIGS. 1, 2), which detect one or more parameters indicative of the way in which the brake pedal is actuated, such as the position, speed and acceleration of the brake pedal. On the basis of the signals sent by the sensor or sensors 15, the electronic controller E adjusts the electric current supplying the solenoid 11A of the proportional solenoid valve 11, so as to achieve the required pressure in the chamber 7 of the PFP device for regulating the feeling on the brake pedal.

Again with reference to FIGS. 1, 2, the outlet 9 of the PFP device for adjusting the feeling on the brake pedal communicates with the discharge reservoir S, also by means of a non-return valve 16, arranged in parallel with respect to the proportional solenoid valve 11, which allows a flow of fluid from the reservoir S towards the pressure chamber 7 of the PFP device, in such a way as to favor the filling of the pressure chamber 7 of the PFP device in the return phase of the movable member 12 (and of the brake pedal) towards the rest position. The main object of the non-return valve 16 is to:

allowing the brake pedal to return to its rest position, without jamming, at the end of braking, allowing the chamber 7 of the PFP device to be filled during the return movement of the movable member 12 even before the movable member opens the opening inlet 8, e avoid cavitation phenomena inside the PFP device which, following repeated operations, could damage the PFP device.

In the example illustrated in the attached drawings, the PFP device is integrated into the cylinder MC and has its casing 6 rigidly connected to the casing 3 of the master cylinder MC. However, it can also be envisaged that the PFP device constitutes a separate unit with respect to the master cylinder MC. In this case, the movable member 12 of the PFP device is, in any case, operatively connected both on one side to the brake pedal and on the other side, by means of a transmission of any type, to the piston 2A of the master cylinder MC.

The Fluid Pressure Transfer Device

Figure 4:
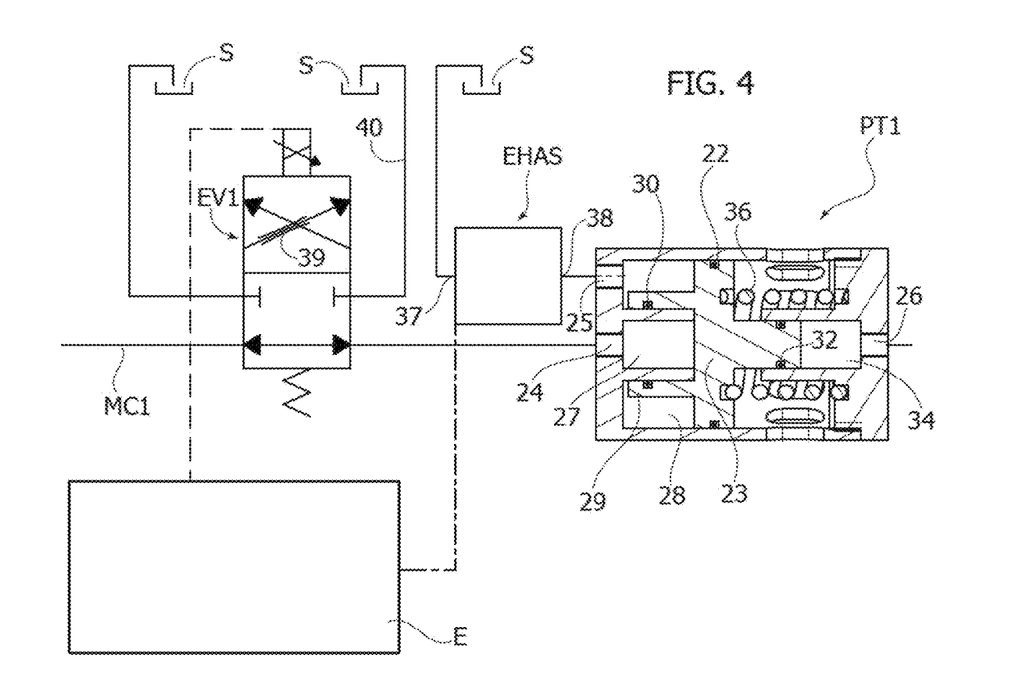
FIG. 4 illustrates an additional detail of FIG. 1 on an enlarged scale.
Figure 5:
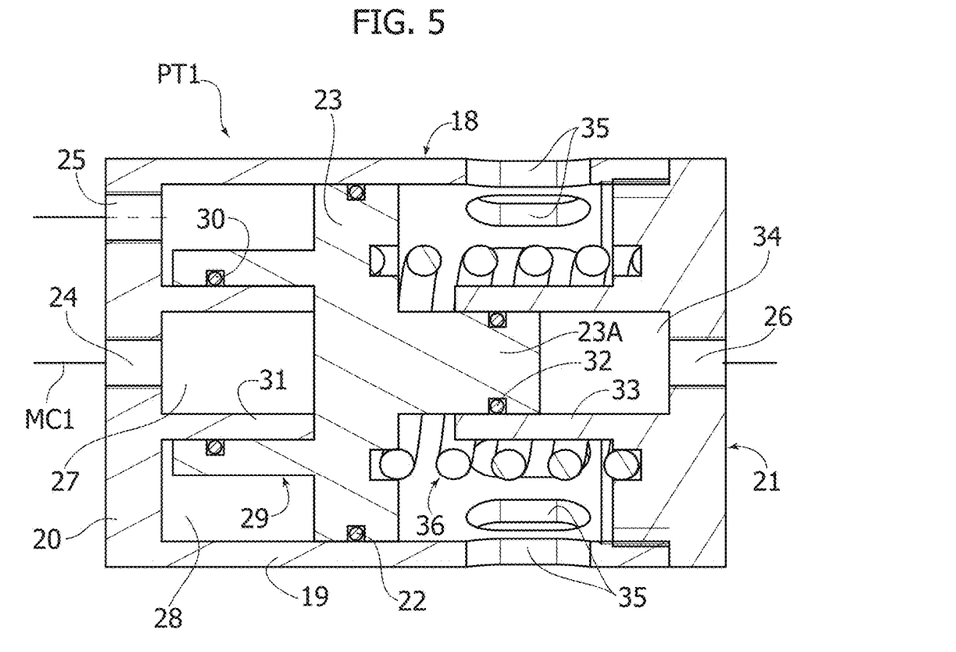
FIG. 5 illustrates a detail of FIG. 4 on an enlarged scale.
Figure 6:
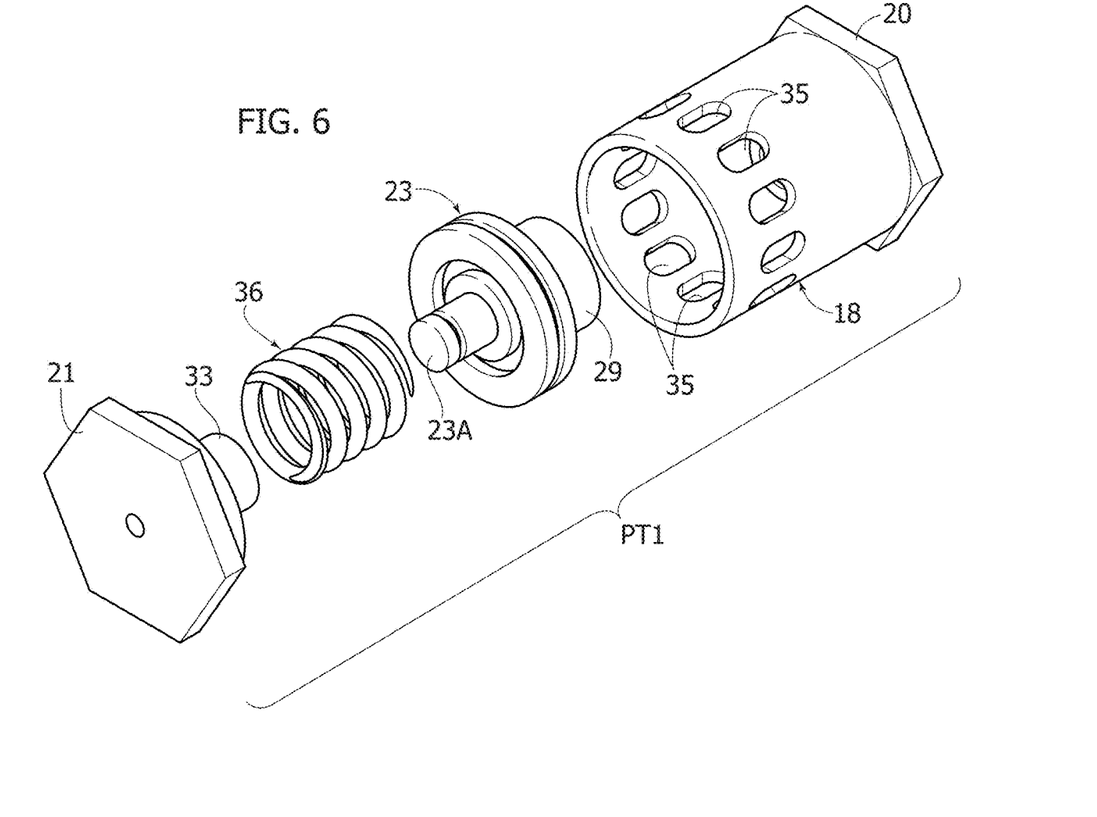
FIG. 6 is an exploded perspective view of the components shown in FIG. 5.

The sub-group 1E comprises, in the embodiment illustrated in FIG. 1, four fluid pressure transfer devices PT1, PT2, PT3, PT4, associated with the brake devices F1, F2, F3, F4 of the motor vehicle wheels, respectively. With reference in particular to FIGS. 4, 5 and 6, which illustrate the circuit associated with the device PT1 (the remaining devices are completely identical), the fluid pressure transfer device comprises a cylinder 18 defined by a casing having a cylindrical wall 19 and two end walls 20, 21. A movable piston member 23 is slidably mounted within the cavity of the cylindrical wall 19, with the interposition of a sealing ring 22.

Two inlet openings 24, 25 are formed in the end wall 20 of the cylinder 18 (FIG. 5). An outlet opening 26 is formed in the end wall 21 of the cylinder 18.

On the side facing the inlet openings 24, 25, the movable piston member 23 faces a first upstream chamber 27, central, communicating with the first inlet opening 24, and a second upstream chamber 28, annular, coaxial with the first upstream chamber 27 and communicating with the second inlet opening 25.

In the specific embodiment illustrated, the two upstream chambers 27, 28 are defined by the fact that an axial tubular appendage 29 extends from the face of the movable piston member 23, facing these chambers, which is slidably mounted, with the interposition of a sealing ring 30, around an axial tubular appendage 31 protruding from the end wall 20. A variant would also be possible in which the tubular appendage 29 of the movable piston member 23 is arranged to slide inside the tubular appendage 31 of the end wall 20. In any case, whatever the position assumed by the movable piston member 23 within the cylinder 18, the aforesaid tubular appendages 29, 31 never leave their mutual engagement, so that—in any condition—the first upstream chamber 27 remains isolated from the second upstream chamber 28.

On the side facing the outlet opening 26, the movable piston member 23 has a central portion 23a of reduced diameter, which is slidably mounted, with the interposition of a sealing ring 32 within a tubular appendage 33 axially protruding from the end wall 21. A variant would be possible in which, instead of the portion of reduced diameter 23a, a tubular appendage is provided, slidably mounted around the tubular appendage 33.

As a result of the arrangement described above, between the central portion 23a of the movable piston member 23 and the end wall 21 a downstream chamber 34 is defined, which communicates with the outlet opening 26. The space between the movable piston member 23 and the end wall 21 surrounding the tubular appendage 33 is, instead, placed in communication with the atmosphere through a circumferential series of openings 35 (see also FIG. 6). Within this space there is a helical spring 36, which tends to oppose a movement of the movable piston member 23 in the direction of the outlet opening 26.

The Electrically-Operated Fluid Pressure Source

With reference now to FIGS. 1 and 4, an EHAS ("Electro-Hydraulic Actuation System") fluid pressure source is associated with each of the pressure transfer devices PT1, PT2, PT3, PT4, which can be, for example, constituted by an electrically-operated pump of any known type, possibly equipped with a pressurized fluid reservoir. Each EHAS has an inlet 37 communicating with the discharge and supply reservoir S, and an outlet 38 connected to the second inlet 25 of the respective pressure transfer device. Each electrically-operated fluid pressure source EHAS is controlled by the electronic controller E to provide, when activated, a fluid pressure within the second upstream chamber 28.

Each electrically-operated fluid pressure source EHAS allows the fluid to flow freely both from the discharge and supply reservoir to the second upstream chamber 28 of the respective pressure transfer device and in a reverse flow direction, ensuring:

minimization of the resistance to advancement of the movable piston member 23, and the absence of cavitation phenomena during the actuating step of the brake pedal, when the movable piston member 23 is operated by the pressurized fluid supplied to the first inlet 24, and minimization of the resistance to return of the movable piston member 23 and the absence of jamming phenomena, when the member 23 is returned to its rest position by the spring 36, during the brake pedal release phase.

The Solenoid Valve for Enabling/Disabling the Master Cylinder

Again with reference to FIG. 1, the first inlet 24 of each pressure transfer device communicates with a respective delivery line MC1 or MC2 of the master cylinder MC through one of the aforesaid solenoid valves EV1, EV2 for enabling or disabling the master cylinder MC. Each of the solenoid valves EV1, EV2 (the solenoid valve EV1 in FIG. 4) has a first operating condition (the condition de-energized by the solenoid valve in the example illustrated) in which the solenoid valve creates a free communication passage of a delivery line of the master cylinder MC (the delivery line MC1 in FIG. 4) with the first inlet 24 of one or more pressure transfer devices PT1, PT2, PT3, PT4. As already indicated, in the embodiment of FIG. 1, each delivery line MC1, MC2 of the master cylinder MC is connected to a respective solenoid valve, respectively, EV1 and EV2, and each of the two solenoid valves EV1, EV2 is connected to two pressure transfer devices, respectively, PT1, PT2 and PT3, PT4, each of which is associated with an electrically-operated fluid pressure source EHAS, and one of the brake devices F1, F2, F3, F4 of a respective wheel of the vehicle.

With reference again to FIG. 4, when the solenoid valve EV1 is in its de-energized rest condition, the delivery line MC1 of the master cylinder MC communicates with the inlet 24 and with the first upstream chamber 27 of the pressure transfer device PT1. In this condition, an intervention on the brake pedal causes, through the master cylinder MC, the supply of pressurized fluid into the delivery line MC1. The fluid pressure reaches the first upstream chamber 27 of the pressure transfer device PT1, which causes a movement of the movable piston member 23, against the action of the spring 36. The movement of the piston member 23 creates a transfer of pressurized fluid from the downstream chamber 34, through the outlet 26, to the hydraulic line AL for actuating one of the brake devices F1, F2, F3, F4.

In addition to, or instead of the pressure transmitted by the master cylinder MC to the first upstream chamber 27 of each pressure transfer device PT1-PT4, it is possible to supply pressurized fluid to the second upstream chamber 28 of each pressure transfer device PT1-PT4, by activating the respective electrically-operated fluid pressure source EHAS.

As a result of the arrangement described above, when each solenoid valve EV1 is in its de-energized rest condition, in which it allows free communication between the delivery line of the master cylinder MC and the first inlet 24 of each pressure transfer device PT1-PT4, the movement of the movable piston member 23, and consequently the actuation of each brake device, may be determined either solely by the fluid pressure generated by the master cylinder, or also by the fluid pressure generated by the electrically-operated source EHAS, which in this case performs an assist function to the brake.

Of course, whatever the operation mode selected, the feeling on the brake pedal is controlled in a completely independent way by the electronic controller E, according to any predetermined program, by means of control of the proportional solenoid valve 11.

If the action of the electrically-operated fluid pressure source EHAS has to completely replace the action of the master cylinder, the master cylinder may be excluded by moving each solenoid valve EV1 and EV2 into its second operating condition (which, in the example illustrated, is obtained by energizing the solenoid of the solenoid valve EV1, EV2). In this second operating condition, the connection between the delivery line MC1 or MC2 of the master cylinder MC and the first inlet 24 of each pressure transfer device PT1-PT4 is interrupted. At the same time, the first inlet 24 of each pressure transfer device PT1-PT4 is placed in communication with the discharge and supply reservoir supply S, while the delivery line MC1, MC2 of the master cylinder is placed in communication with the discharge and supply reservoir S through a restricted passage 39 (FIG. 4), which can be integrated into the solenoid valve EV1 or EV2 or be arranged in the line 40 that connects the corresponding outlet of the solenoid valve with the discharge reservoir.

Therefore, when each solenoid valve EV1 and EV2 is in its second operating condition, any influence of the master cylinder MC on the brake devices is canceled, and the actuation of the brake devices F1, F2, F3, F4 is solely determined by the respective electrically-operated fluid pressure sources EHAS. This operating mode may be controlled by the electronic controller E according to any predetermined logic. It can also be activated to obtain an ABS effect when, during braking controlled by the brake pedal, the tendency of one or more wheels of the vehicle to lock is detected, due to the reaching of the grip limit. According to a technique known per se, the electronic controller E may detect a condition of incipient locking of a wheel following the receipt of a signal coming from one or more sensors arranged and configured to indicate this condition (for example, a sensor of the angular speed of each wheel, configured to detect a decrease in the angular velocity below a predetermined threshold). Upon the occurrence of this condition, the electronic controller E switches each solenoid valve EV1, EV2 to the operating condition of disabling the master cylinder MC, so that the first upstream chamber 27 of each pressure transfer device PT1-PT4 is discharged, while the movable piston member 23 of each pressure transfer device PT1-PT4 is controlled by the effect of the fluid pressure generated by the respective electrically-operated fluid pressure source EHAS. Consequently, the respective brake devices F1-F4 are actuated by the effect of the pressure generated solely by the EHAS devices. In the condition of incipient locking of one or more wheels, each EHAS device is controlled in such a way as to generate a reduced fluid pressure in the actuation line AL of the brake devices F1-F4, this reduced pressure being chosen in such a way as to avoid locking of the wheel.

The main functions of the restricted passage 39 associated with each solenoid valve EV1, EV2, are the following:
to ensure that the driver does not experience a block in the positioning of the brake pedal when performing assisted braking or emergency braking; this results in ensuring that the movable member of the master cylinder can continue to move even in the case of a controlled interruption of the hydraulic connection between the master cylinder and the pressure transfer device associated therewith;
to ensure that the driver continues to experience load feedback resistant to brake pedal advancement even when performing assisted braking or emergency braking; this results in guaranteeing a pressure difference between upstream and downstream of the restricted passage 39 at a flow rate of the oil coming from the master cylinder; in fact, this specific function would not be achievable by means of a free communication line towards the discharge and supply reservoir.

At the same time, each EHAS device allows the free passage of the fluid both from the discharge and supply reservoir towards the second upstream chamber 28 of the pressure transfer device PTi and in a reverse flow direction, guaranteeing:
minimization of the resistance to advancement of the movable piston member 23, and the absence of cavitation phenomena during the actuating step of the brake pedal, when the movable piston member 23 is operated by the pressurized fluid supplied to the first inlet 24, and
minimization of the resistance to return of the movable piston member 23 and the absence of jamming phenomena, when the member 23 is returned to its rest position by the spring 36, during the brake pedal release phase.

In another embodiment, each solenoid valve for enabling/disabling the master cylinder EV1, EV2, has a third operating condition, intermediate between its first operating condition and its second operating condition, in which the solenoid valve is temporarily left open in the passage from the first operative condition to the second operative condition, and in the passage from the second operative condition to the first operative condition, so as to avoid a return pressure stroke on the brake pedal.

As is evident from the above description, the electronic controller E is configured and programmed to control the enabling/disabling solenoid valves EV1, EV2 and the electrically-operated fluid pressure sources EHAS associated with the respective pressure transfer devices PT1-PT4 and to the respective brake devices F1-F4 so as to create one or more of the operating modes described above. The electronic controller E may also command different operating modes of the two solenoid valves EV1, EV2 and/or of the different electrically-operated fluid pressure sources EHAS so as to command the brake devices associated with the different wheels of the vehicle in a different way, for example, to achieve a stabilizing effect by means of the Electronic Stability Control (ESC) system.

Figure 7:
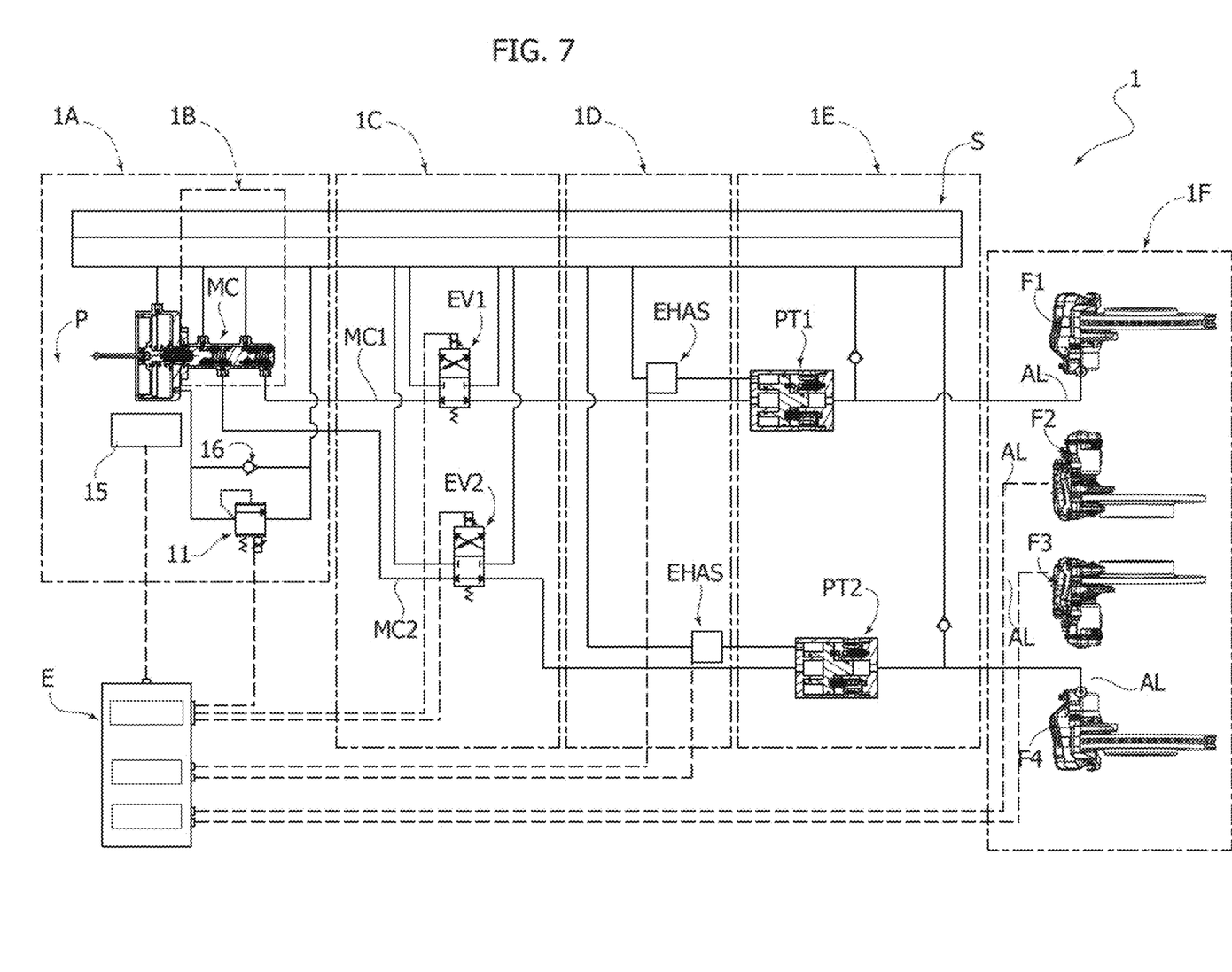
FIG. 7 is a diagram of a second embodiment of the system according to the invention.

FIG. 7 shows a second embodiment in which the system described above is used to control only two hydraulically-operated brake devices F1, F4 (for example, associated with the two front wheels or the two rear wheels) while the other two brake devices brake F2, F3 are electrically-operated and are controlled directly by the electronic controller E. In the case of the embodiment of FIG. 7, each of the two delivery lines MC1, MC2 of the master cylinder MC is connected through a respective solenoid valve EV1, EV2, to a single pressure transfer device PT1 or PT2. Therefore, only two pressure transfer devices PT1, PT2 are provided, each connected to a respective electrically-operated fluid pressure source EHAS, for actuating the brake devices F1, F4, which are hydraulically-operated.

In all the embodiments described above, whatever the chosen embodiment is and whatever the operating mode adopted, the feeling on the brake pedal is controlled by the electronic controller E, through the adjustment device of the feeling on the pedal PFP and the associated proportional solenoid valve 11, completely independent of the actuation pressure of the brake devices.

An important characteristic of the invention is the possibility of being used with any type of brake device, in particular, with any type of hydraulically-operated disc brake, with floating or fixed calipers, combined respectively with fixed or floating brake discs. The brake discs can also be of any known type, in particular also of the self-ventilating type. Likewise, the system can also be adopted with hydraulically-operated drum brake devices.

Thanks to all the aforesaid characteristics, the system according to the invention allows the production costs of the braking system to be significantly reduced, since it can use brake devices of any known type, while being able to introduce new functions. The system of the invention also allows the use of safety components designed with technologies and manufactured with processes with a high level of maturity. Therefore, the possible incidence of reliability and safety problems is minimized.

Furthermore, the system of the invention has a wide field of application, since it allows application to any type of vehicle and to any type of wheel suspension.

Of course, without prejudice to the principle of the invention, the details of construction and the embodiments may vary widely with respect to those described and illustrated purely by way of example, without departing from the scope of the present invention, as defined by the attached claims.

What is claimed is:

1. A motor-vehicle braking system, comprising:
   a master cylinder including at least one pumping piston operatively connected to a brake pedal and configured to supply pressurized fluid to a delivery line of the master cylinder following an actuation of the brake pedal, so as to cause activation of a hydraulically-operated brake device associated with a respective wheel of the vehicle,
   a hydraulic adjustment device of a pedal feeling operatively associated with the brake pedal and configured to generate and modulate a force that opposes the actuation of the brake pedal,
   said adjustment device of the pedal feeling comprising:
      a hydraulic cylinder, with a pressure chamber having an inlet communicating with a discharge and supply reservoir and an outlet communicating with the discharge and supply reservoir by a pressure-limiting proportional solenoid valve, and
      a pumping member movable in the hydraulic cylinder and operatively connected to the brake pedal, in such a way as to pressurize the fluid in the pressure chamber following an actuation of the brake pedal, so as to generate said force that opposes the actuation of the brake pedal,
   said braking system also comprising an electronic controller, configured and programmed to control said proportional pressure-limiting solenoid valve which communicates the outlet of the pressure chamber to the discharge and supply reservoir, in such a way as to vary the pressure within said pressure chamber and, therefore, the feeling on the brake pedal, based on signals received by said electronic controller, and indicative of one or more parameters selected among position of the brake pedal, speed of the brake pedal and acceleration of the brake pedal;
   a pressure transfer device, for transferring hydraulic pressure from the delivery line of the master cylinder to a hydraulic actuating line of the brake device and said pressure transfer device comprising:
      a cylinder, with a movable member movable within the cylinder between a first upstream chamber, communicating with the delivery line of the master cylinder, and a downstream chamber, communicating with the hydraulic actuating line of the brake device, in such a way that the pressure generated by said master cylinder in said delivery line, following an intervention on the brake pedal causes a movement of the movable member of the pressure transfer device, which generates a resulting pressure in the hydraulic actuating line of the brake device,
   said pressure transfer device also comprising a second upstream chamber operatively arranged in parallel with said first upstream chamber, and
   said braking system also comprising an electrically-operated fluid pressure source, in such a way that, regardless of the pressure in the delivery line of the master cylinder, the movable member of the pressure transfer device can be operated by said electrically-operated fluid pressure source, to gen pressure in the hydraulic actuating line of the brake device.

2. A braking system according to claim 1, wherein said hydraulic adjustment device of the pedal feeling is integrated into the master cylinder and has a casing rigidly connected to the casing of the master cylinder with said movable pumping member of the adjustment device of the pedal feeling, which is rigidly connected to said at least one pumping piston of the master cylinder.

3. A braking system according to claim 1, wherein said hydraulic adjustment device of the pedal feeling is a unit separate from said master cylinder and includes said movable pumping member which is operatively connected, by means of a transmission, to said at least one piston of the master cylinder.

4. A braking system according to claim 1, wherein the outlet is connected to the discharge and supply reservoir by a one-way valve, and is arranged in parallel to the proportional solenoid valve, to enable a flow from the reservoir towards the pressure chamber of the hydraulic adjustment device of the pedal feeling, in such a way as to facilitate filling of the pressure chamber of said device when the movable pumping member and the brake pedal return towards rest positions.

5. A braking system according to claim 1, wherein said first upstream chamber and said second upstream chamber of the pressure transfer device are arranged coaxially to each other around each other.

6. A braking system according to claim 5, wherein:
said pressure transfer device has a casing defining a cylindrical cavity,
the movable member of the pressure transfer device comprises a piston slidably mounted within said cylindrical cavity and having a first face facing said upstream chambers, and a second face facing said downstream chamber,
said piston of the pressure transfer device having body with a first tubular appendage, protruding axially from said first face, the appendage slidably mounted around or within a second tubular appendage protruding axially from a first end wall of the casing,
in such a way that the aforesaid first upstream chamber is defined inside the first tubular appendage and the second tubular appendage, and communicates with the delivery line of the master cylinder by means of a first inlet formed in said first end wall, and
in such a way that said second upstream chamber is defined coaxially outside the first tubular appendas d the second tubular appendage which are in sliding engagement with each other, and communicates with the electrically-operated fluid pressure source through a second inlet formed in said first end wall,
and in which a central portion of reduced diameter axially projects from the second face of said piston, said central portion being slidably mounted within or around a third tubular appendage protruding axially from a second end wall of the casing,
in such a way that said downstream chamber is defined inside the tubular appendage protruding from said second end wall, and communicates with the hydraulic actuating line of the brake device through an outlet formed in said second end wall,
and in which coaxially outside said third tubular appendage protruding from the second end wall a chamber communicating with the atmosphere is defined, in which a helical spring is arranged, the spring pushing the piston towards said upstream chambers.

7. A braking system according to claim 1, wherein in the delivery line of the master cylinder, between the outlet of the master cylinder and said first upstream chamber of the pressure transfer device, a solenoid valve for enabling/disabling the master cylinder is interposed, having a first operating condition, in which it puts the outlet of the master cylinder in communication with said first upstream chamber of the pressure transfer device, and a second operating condition, in which the first upstream chamber of the pressure transfer device is placed in communication with the discharge and supply reservoir and in which the outlet of the master cylinder is placed in communication with the discharge and supply reservoir through a restricted passage.

8. A braking system according to claim 7, wherein said solenoid valve for enabling/disabling the master cylinder is in said first operating condition when it is de-energized and is in said second operating condition when it is energized.

9. A braking system according to claim 7, wherein said solenoid valve for enabling/disabling the master cylinder has a third operating condition, intermediate between its first operating condition and its second operating condition, in which the solenoid valve is temporarily left open when a passage from the first operating condition to the second operating condition or vice versa is commanded, in such a way as to avoid a return pressure stroke on the brake pedal.

10. A braking system according to claim 7, wherein the electronic controller is configured and programmed to control said solenoid valve for enabling/disabling the master cylinder and said electrically-operated fluid pressure source in such a way as to be able to selectively activate one or more of the following operating modes:
a basic braking operating mode, in which said solenoid valve for enabling/disabling the master cylinder is in its first operating condition enabling the master cylinder, and the electrically-operated fluid pressure source is inactive, so that the brake device is operated by the brake pedal by means of the master cylinder,
an assisted-braking operating mode, in which said solenoid valve for enabling/disabling the master cylinder is in its first operating condition enabling the master cylinder, and the electrically-operated fluid pressure source is active, so that the brake device is operated by the brake pedal by means of the master cylinder, but the fluid pressure supplied to the brake device is the result of both the pressure generated by the master cylinder and the pressure generated by the electrically-operated fluid pressure source,
an automatic braking operating mode, in which said solenoid valve for enabling/disabling the master cylinder is in its second operating condition disabling the master cylinder, and the electrically-operated fluid pressure source is active, so that the brake device is only operated by the pressure generated by said electrically-operated fluid pressure source, and
an operating mode for activating an ABS effect, in which, following detection by the electronic controller of a condition of incipient locking of the vehicle wheel during a braking controlled by the brake pedal through the master cylinder or automatically, said solenoid valve for enabling/disabling the master cylinder is switched from its first enabling operating condition to its second disabling operating condition of the master cylinder, and said electrically-operated fluid pressure source is activated to generate reduced pressure in the supply line of the brake device, in order to avoid locking of the wheel during braking.

11. A braking system according to claim 1, wherein said master cylinder comprises at least two pumping pistons operatively arranged in series with each other and configured to supply pressurized fluid to at least two delivery lines of the master cylinder, following actuation of the brake pedal,
in that a respective solenoid valve for enabling/disabling the master cylinder is interposed in each of the at least two delivery lines of the master cylinder, which solenoid valve controls the connection between a respective outlet of the master cylinder and one or more pressure transfer devices, and
said pressure transfer devices connected to a respective electrically-operated fluid pressure source, and arranged to generate fluid pressure in the hydraulic actuating line of a respective brake device.

12. A braking system according to claim 11, wherein each of the two delivery lines of the master cylinder controls two brake devices associated with two wheels of the vehicle, through a respective enabling/disabling solenoid valve, connected to two pressure transfer devices that control the fluid pressure in the actuation lines of the two brake devices, and which are also each connected to a respective electrically-operated fluid pressure source.

13. A braking system according to claim 11, wherein each of the two delivery lines of the master cylinder controls only one respective brake device associated with a wheel of the vehicle, by means of an enabling/disabling solenoid valve, connected to a pressure transfer device, which controls the fluid pressure in the actuation line of said respective brake device, and which is also connected to a respective electrically-operated fluid pressure source, said braking system also including two electrically-operated brake devices associated with two additional wheels of the vehicle, which are controlled by said electronic controller.

14. A method of controlling a braking system of a vehicle, in which the braking system comprises a master cylinder including at least one pumping piston operatively connected to a brake pedal, a brake pedal actuating the pumping piston to supply pressurized fluid into a delivery line of the master cylinder, so as to cause activation of a hydraulically-operated brake device associated with a respective wheel of the vehicle, a pressure transfer device transferring hydraulic pressure from the delivery line of the master cylinder to an hydraulic actuating line of the brake device, said pressure transfer device comprising:

a cylinder, with a movable member within the cylinder between a first upstream chamber, communicating with the delivery line of the master cylinder, and a downstream chamber, communicating with the hydraulic actuating line of the brake device, so that the pressure generated by said master cylinder in said delivery line, following an intervention on the brake pedal, causes a movement of the movable member of the pressure transfer device, which generates a resulting pressure in the hydraulic actuating line of the brake device, said pressure transfer device also comprising a second upstream chamber, operatively arranged in parallel with said first upstream chamber, an electrically-operated fluid pressure source, communicating with said second upstream chamber of said pressure transfer device, the electrically-operated fluid pressure source arranged in such a way that, regardless of the pressure in the delivery line of the master cylinder, the movable member of the pressure transfer device operable by said electrically-operated fluid pressure source to generate a pressure in the hydraulic actuating line of the brake device, a solenoid valve for enabling/disabling the master cylinder arranged in the delivery line of the master cylinder, between an outlet of the master cylinder and said first upstream chamber of the pressure transfer device, said solenoid valve for enabling/disabling the master cylinder having a first operating condition, wherein the outlet of the master cylinder is in communication with said first upstream chamber of the pressure transfer device, and a second operating condition, in which the first upstream chamber of the pressure transfer device is placed in communication with a discharge and supply reservoir, and in which the outlet of the master cylinder is placed in communication with the discharge reservoir through a restricted passage, an electronic controller controlling said solenoid valve for enabling/disabling the master cylinder and said electrically-operated fluid pressure source in such a way as to be able to selectively activate one or more of the following operating modes:

a basic braking operating mode, in which said solenoid valve for enabling/disabling the master cylinder is in its first operating condition enabling the master cylinder, and the electrically-operated fluid pressure source is inactive, so that the brake device is operated by the brake pedal by means of the master cylinder, an assisted-braking operating mode, in which said solenoid valve for enabling/disabling the master cylinder is in its first operating condition enabling the master cylinder, and the electrically-operated fluid pressure source is active, so that the brake device is operated by the brake pedal by means of the master cylinder, but the fluid pressure supplied to the brake device is the result of both the pressure generated by the master cylinder and the pressure generated by the electrically-operated fluid pressure source, an automatic braking operating mode, in which said solenoid valve for enabling/disabling the master cylinder is in its second operating condition disabling the master cylinder, and the electrically-operated fluid pressure source is active, so that the brake device is only operated by the pressure generated by said electrically-operated fluid pressure source, and an operating mode for activating an ABS effect, in which, following detection by the electronic controller of a condition of incipient locking of a vehicle wheel during braking controlled by the brake pedal through the master cylinder or automatically, said solenoid valve for enabling/disabling the master cylinder is switched from its first enabling operating condition to its second operating condition disabling the master cylinder and said electrically-operated fluid pressure source is activated to generate reduced pressure in the supply line of the brake device, in order to avoid locking of the wheel during braking.

15. A control method according to claim 14, in which the braking system further comprises a hydraulic device for adjusting the pedal feeling, associated with the brake pedal, configured to generate and modulate a force that opposes the actuation of the pedal brake, said pedal feeling adjustment device comprising:

a hydraulic cylinder, with a pressure chamber having an inlet communicating with a discharge and supply reservoir and an outlet communicating with the discharge and supply reservoir by means of a proportional pressure-limiting solenoid valve, and a pumping member movable in the hydraulic cylinder and operatively connected to the brake pedal, in such a way as to pressurize the fluid in the pressure chamber following an actuation of the brake pedal, so as to generate the force that opposes the actuation of the brake pedal, controlling, by means of said electronic controller, said proportional pressure-limiting solenoid valve, in such a way as to vary the feeling on the brake pedal, independently of the fluid pressure supplied to the brake device on the basis of signals received from said electronic controller, and indicative of one or more parameters, selected among position of the brake pedal, speed of the brake pedal and acceleration of the brake pedal.

16. A control method according to claim 14, in which said master cylinder comprises at least two pumping pistons operatively arranged in series with each other and configured to supply pressurized fluid to at least two delivery lines of the master cylinder following an actuation of the brake pedal, in which a respective solenoid valve for enabling/disabling the master cylinder is interposed in each of the at least two delivery lines of the master cylinder, which controls the connection between a respective outlet of the master cylinder, and one or more pressure transfer devices, is connected to a respective electrically-operated fluid pressure source and is designed to generate fluid pressure in the hydraulic actuating line of a respective brake device, said electronic controller controlling the solenoid valves for enabling/disabling the master cylinder, which are associated with the two delivery lines of the master cylinder and the electrically-operated fluid pressure sources associated with respective pressure transfer devices and respective brake devices, by, in either identical or differentiated modes, to obtain either identical or differentiated braking actions on the different wheels of the vehicle, depending upon the operating conditions of each wheel, upon any tendency of each wheel to lock during braking and depending upon the need to correct any driving instability of the vehicle.

17. A method according to claim 16, wherein said braking system controls two hydraulically-operated brake devices associated with two wheels of the vehicle, while the other two wheels of the vehicle are provided with electrically-operated brake devices, the electronic controller controlling actuation of said electrically-operated brake devices on the basis of signals indicative of one or more parameters selected among position of the brake pedal, speed of the brake pedal and acceleration of the brake pedal, and as a function of any tendency of the wheels associated with the electrically operated brake devices to lock during braking, and depending upon any need to correct an incipient driving instability of the vehicle.

* * * * *

UNITED STATES PATENT AND TRADEMARK OFFICE
CERTIFICATE OF CORRECTION

PATENT NO. : 12,370,986 B2
APPLICATION NO. : 17/664716
DATED : July 29, 2025
INVENTOR(S) : Ieluzzi et al.

Page 1 of 1

It is certified that error appears in the above-identified patent and that said Letters Patent is hereby corrected as shown below:

In the Claims

Column 15, Line 31: Claim 6, Delete "appendas d" and insert -- appendage and --

Signed and Sealed this
Ninth Day of September, 2025

Coke Morgan Stewart
*Acting Director of the United States Patent and Trademark Office*